United States Patent
Jan et al.

(10) Patent No.: US 8,370,127 B2
(45) Date of Patent: Feb. 5, 2013

(54) SYSTEMS AND METHODS FOR BUILDING ASSET BASED NATURAL LANGUAGE CALL ROUTING APPLICATION WITH LIMITED RESOURCES

(75) Inventors: Ea-Ee Jan, Ardsley, NY (US); Xiang Li, White Plains, NY (US); David Lubensky, Brookfield, CT (US); Osamuyimen Thompson Stewart, Piscataway, NJ (US)

(73) Assignee: Nuance Communications, Inc., Burlington, MA (US)

( * ) Notice: Subject to any disclaimer, the term of this patent is extended or adjusted under 35 U.S.C. 154(b) by 109 days.

(21) Appl. No.: 11/454,694

(22) Filed: Jun. 16, 2006

(65) Prior Publication Data

US 2008/0010280 A1 Jan. 10, 2008

(51) Int. Cl.
*G06F 17/27* (2006.01)
*G10L 15/00* (2006.01)
*G10L 11/00* (2006.01)
*H04M 1/64* (2006.01)

(52) U.S. Cl. ............ 704/9; 704/231; 704/257; 704/270; 379/88.02

(58) Field of Classification Search .................. 704/2, 5, 704/239, 257
See application file for complete search history.

(56) References Cited

U.S. PATENT DOCUMENTS

| | | | |
|---|---|---|---|
| 4,908,866 A | 3/1990 | Goldwasser et al. | |
| 5,995,921 A * | 11/1999 | Richards et al. | 704/9 |
| 6,014,427 A * | 1/2000 | Hanson et al. | 379/67.1 |
| 6,161,087 A | 12/2000 | Wightman et al. | |
| 6,233,575 B1 | 5/2001 | Agrawal et al. | |
| 6,269,153 B1 | 7/2001 | Carpenter et al. | |
| 6,578,032 B1 | 6/2003 | Chandrasekar et al. | |
| 7,092,888 B1 | 8/2006 | McCarthy et al. | |
| 7,263,489 B2 * | 8/2007 | Cohen et al. | 704/270 |
| 7,363,212 B2 | 4/2008 | Erhart et al. | |
| 7,453,992 B2 | 11/2008 | Wu et al. | |
| 7,603,353 B2 | 10/2009 | Knepper et al. | |
| 7,739,286 B2 * | 6/2010 | Sethy et al. | 707/737 |
| 7,813,926 B2 * | 10/2010 | Wang et al. | 704/245 |
| 7,853,451 B1 * | 12/2010 | Gupta et al. | 704/257 |
| 7,937,263 B2 * | 5/2011 | Carrier et al. | 704/9 |
| 8,234,118 B2 * | 7/2012 | Pyo et al. | 704/260 |
| 2001/0016814 A1 * | 8/2001 | Hauenstein | 704/231 |

(Continued)

FOREIGN PATENT DOCUMENTS

| | | |
|---|---|---|
| CN | 1333615 A | 1/2002 |
| CN | 1645375 A | 7/2005 |

OTHER PUBLICATIONS

Gorin et al, "How may i Help you", 1997, Elsevier Sciences, pp. 113-127.*

(Continued)

*Primary Examiner* — Richemond Dorvil
*Assistant Examiner* — Olujimi Adesanya
(74) *Attorney, Agent, or Firm* — Wolf, Greenfield & Sacks, P.C.

(57) ABSTRACT

A method of processing limited natural language data to automatically develop an optimal feature set, bypassing the standard Wizard of OZ (WOZ) approach. Natural language understanding models process existing data from other domains, such as the Internet, for domain-specific adaptation through the use of an optimal feature set. When the optimal feature set is passed on to any engine, the optimal feature set produces robust models that can be used for natural language call routing.

23 Claims, 3 Drawing Sheets

U.S. PATENT DOCUMENTS

| | | | |
|---|---|---|---|
| 2002/0032564 A1* | 3/2002 | Ehsani et al. | 704/235 |
| 2002/0077815 A1 | 6/2002 | Zhang et al. | |
| 2002/0116174 A1* | 8/2002 | Lee et al. | 704/9 |
| 2003/0083882 A1* | 5/2003 | Schemers III et al. | 704/270.1 |
| 2003/0110023 A1 | 6/2003 | Bangalore et al. | |
| 2003/0130841 A1 | 7/2003 | Bangalore et al. | |
| 2003/0130849 A1* | 7/2003 | Durston et al. | 704/270 |
| 2003/0212561 A1* | 11/2003 | Williams et al. | 704/270.1 |
| 2004/0030541 A1 | 2/2004 | Chou et al. | |
| 2004/0199375 A1* | 10/2004 | Ehsani et al. | 704/4 |
| 2005/0044487 A1 | 2/2005 | Bellegarda et al. | |
| 2005/0091057 A1* | 4/2005 | Phillips et al. | 704/270.1 |
| 2005/0283475 A1 | 12/2005 | Beranek et al. | |
| 2006/0025995 A1* | 2/2006 | Erhart et al. | 704/239 |
| 2006/0080107 A1 | 4/2006 | Hill et al. | |
| 2006/0106613 A1* | 5/2006 | Mills | 704/270 |
| 2006/0149554 A1 | 7/2006 | Begeja et al. | |
| 2006/0195321 A1* | 8/2006 | Deligne et al. | 704/257 |
| 2007/0156392 A1* | 7/2007 | Balchandran et al. | 704/9 |
| 2007/0244690 A1 | 10/2007 | Peters | |

OTHER PUBLICATIONS

Carroll et al, Vector-based Natural Language Call Routing, 1999, ACL, vol. 25 No. 3, p. 361-388.*

Pierraccini et al, "Etude, A Recursive Dialog Manager with Embedded User Interface Patterns", Dec. 2001, IEEE workshop on Automatic Speech recognition and Understanding, pp. 1-4.*

Pargellis et al, "An Automatic Dialogue Generation Platform for Personalized Dialogue Applications", 2003, Elsevier speech Communication, vol. 42, pp. 329-351.*

Pieraccini et al., "Where do we go from here? Research and commercial spoken dialog systems", Sep. 2005, $6^{th}$ digital workshop on Discourse and Dialog, pp. 1-10.*

Gorin et al., "How May I Help You?", Elsevier Sciences Publication, 1997, Speech Communication 23 (1997), 113-127.

Office Action for Chinese Application No. 200780018574.X mailed Aug. 12, 2010.

Douglas et al., "Mining Customer Care Dialogs for 'Daily News'", IEEE Transactions on Speech and Audio Processing, Special Issue on Data Mining of Speech, Audio and Dialog, vol. 13, No. 5, 2005.

Kawahara et al., "Topic Independent Language Model for Key-Phrase Detection and Verification," IEEE International Conference on Acoustics, Speech, and Signal Processing, 1999.

Wright et al, "Automatic Acquisition of Salient Grammar Fragments for Call-Type Classification," EuroSpeech '97, $5^{th}$ European Conference on Speech Communication and Technology, Rhodes, Greece, Sep. 1997.

Office Action for Chinese Application No. 200780018574.X mailed Jul. 23, 2012.

Office Action for Chinese Application No. 200780018574.X mailed Dec. 23, 2011.

* cited by examiner

SYSTEMS AND METHODS FOR BUILDING ASSET BASED NATURAL LANGUAGE CALL ROUTING APPLICATION WITH LIMITED RESOURCES

BACKGROUND OF THE INVENTION

1. Field of the Invention

The present invention relates generally to a data processing system. More specifically, the present invention relates to a computer implemented method, apparatus, and computer program product for building data used by the understanding model of a natural language call routing application.

2. Description of the Related Art

Currently there are two predominant models for automated call center routing: (i) a directed system, and (ii) a natural language system. In a directed system, the system prompts the user as to what to say to the system. A natural language system is an open ended system allowing the user to say what the user wants without prompting the user about what to say.

The conventional process of building a natural language call routing system for an automatic contact center solution requires a tremendous amount of effort in the data collection process. A typical approach is to use a Wizard of OZ (WOZ) system for data collection. A WOZ system is a partially implemented system where the user hears an opening prompt and then says their request. However, instead of the system making the routing decision, a human, referred to as a "wizard," manually routes the call. During this process, the interaction audio is saved and transcribed for the purpose of training a natural language understanding model. A WOZ system is used to collect data, from actual users, regarding how people speak. Typically, 20,000-30,000 utterances need to be collected to build the database. A WOZ system builds a database based on a statistical approach and needs data to support conclusions.

However, a WOZ system has several drawbacks. Building a WOZ system requires a significant investment in terms of capital costs. A WOZ system also requires a huge amount of effort to build. Furthermore, a WOZ system, typically, is tied to the deployment infrastructure of the particular implementation. Examples of such infrastructures are network setup, computer telephony interface (CTI) and telephony environment. CTI is a system interface that sits between the computer and the telephone in the call center. Each particular infrastructure requires customization of the WOZ system. Therefore, building a WOZ system that is a reusable asset is very difficult.

Furthermore, building a WOZ system requires agent involvement. Agents can make mistakes during data collection and their personal influence can also affect both the quality and consistency of the collected data. Even worse, these errors made by the agents will affect user experience, creating user dissatisfaction, on the system, because the data collection process is operated on a live system with real callers. Additionally, agent training is necessary and critical to the success of a WOZ system. This training is expensive and time consuming. Data clean up is also necessary in a WOZ system. All these will lead to additional cost and resources.

Therefore, it would be beneficial to have an improved method for building a natural language call routing application.

SUMMARY OF THE INVENTION

Exemplary embodiments describe a computer implemented method, a computer program product and a data processing system for building data used by the understanding model of a natural language call routing application. A plurality of topic descriptions is provided. Each topic description of the plurality of topic descriptions describes a meaning of a topic of a plurality of topics. Training data, which is based upon the plurality of topic descriptions, is provided. Keywords in the training data are identified. An optimal feature set, based on the keywords, is created.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
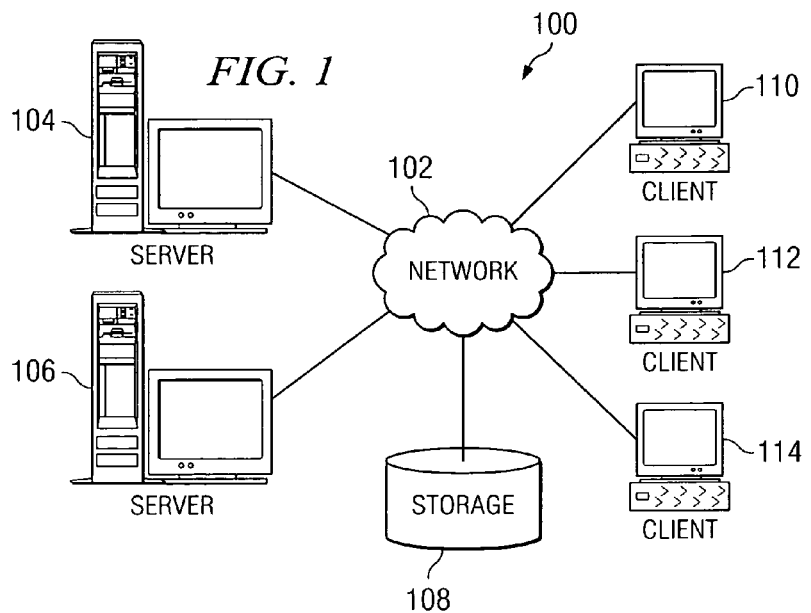
FIG. 1 is a pictorial representation of a network of data processing systems in which exemplary aspects may be implemented.
Figure 2:
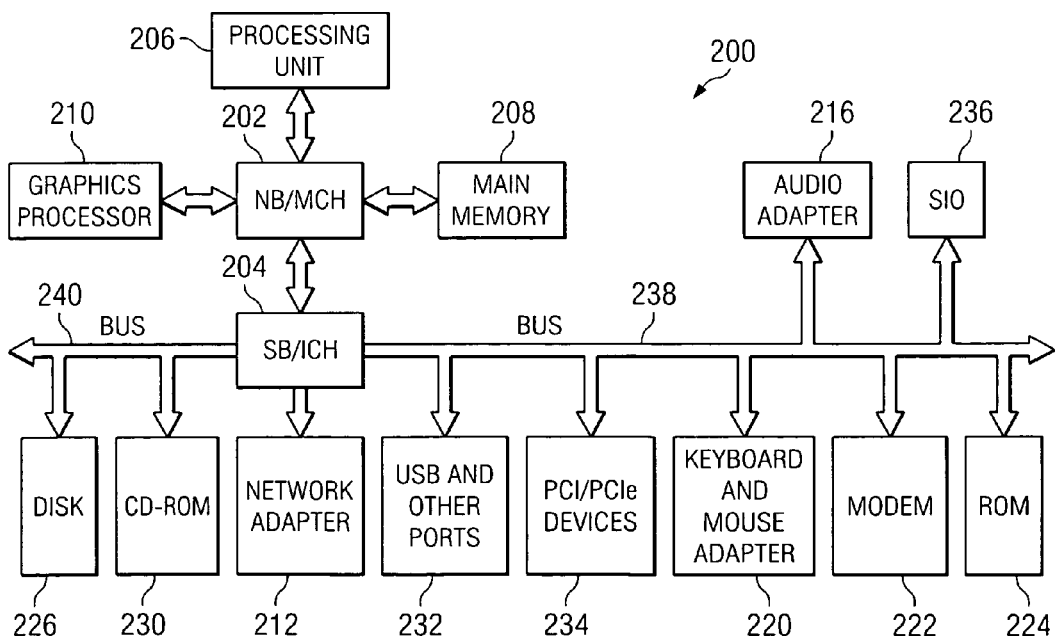
FIG. 2 is a block diagram of a data processing system in which exemplary aspects may be implemented.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which aspects may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
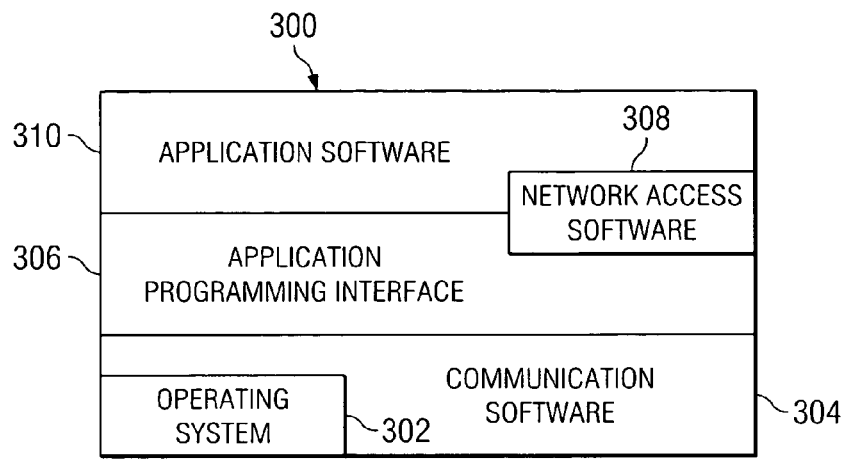
FIG. 3 is a block diagram showing typical software architecture for a server-client system in accordance with an exemplary embodiment.

Turning to FIG. 3, typical software architecture, generally designated by reference number 300, for a server-client system is depicted in accordance with an exemplary embodiment. At the lowest level, operating system 302 is utilized to provide high-level functionality to the user and to other software. Operating system 302 may be implemented in server 104 or client 110 in FIG. 1, in which computer usable code or instructions implementing the processes for embodiments of the present invention may be located. Such an operating system typically includes BIOS. Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a LAN, WAN, or the Internet. With the Internet, this software may include programs, such as Web browsers.

Application software 310 represents any number of software applications designed to react to data through a communications port to provide the desired functionality the user seeks, such as a natural language call routing application. Applications at this level may include those necessary to handle data, video, graphics, photos or text, which can be accessed by users of the Internet.

In exemplary embodiments, instead of setting up a WOZ system to collect data and build the natural language call routing application based upon the collected data, topic descriptions are taken directly from the Voice User Interface (VUI) design people. Topic descriptions briefly describe the meaning of each topic in the natural language call routing application. A topic is the destination of a phone call. The topic descriptions are pre-processed, common words are removed, and an initial topic classification model is built. A topic classification model is a model used to route the phone call of a user. A topic classification model is used in conjunction with the statement of a user to determine the routing destination of the phone call of the user. A topic classification model is a summarization of all the information produced from the topic descriptions. A topic classification model is embodied in data that describes the relationship between the semantic meaning of a user statement during a phone call and the corresponding destination for the phone call. An initial topic classification model is the first topic classification model created for a natural language call routing application, which may be modified and refined over time based on additional data from other sources. The performance of this initial topic classification model is very compatible with the performance of the WOZ system. Exemplary embodiments require as few as one sentence per topic in the topic description. Consequently, the requirement of a large amount of initial training data in the traditional approach is eliminated. Various exemplary embodiments may be implemented for data collection purposes.

An exemplary embodiment may be incorporated into a text based data collection system, instead of a WOZ system, which may be a stand alone application or a web application. The initial topic classification model can generate initial tagging, for either the single best or the n-best results, and provide feedback based upon text input during the data collection process. Tagging is assigning a topic to each sentence based on the semantic meaning of the sentence. The feedback and initial tagging results provides interaction with users. This can be used to automatically control the distribution of the collected data and improve the data collection process.

Another exemplary embodiment may serve as the initial topic classification model to filter the large amount of generalized text data, as well as extract meaningful and helpful sentences for each specific deployment. The data source can be from the Internet, existing text resources from other applications on a different domain, or any other sources. The filter output, after passing through the initial topic classification model, can be used to refine the initial topic classification model, which will improve the performance of a statistical natural language call routing application.

In another exemplary embodiment, the initial topic classification model may also be used in a WOZ system. The initial topic classification model can suggest topics as possible destinations for use in classifying collected data. The suggested topics can help agents in making decisions during data collection in the WOZ system. The suggested topics will alleviate the efforts of agents, and improve user experience on the WOZ system during the data collection process. The initial topic classification model then may be improved using the data collected through use of the suggested topics, which will in turn increase the performance and user satisfaction of a statistical natural language call routing application.

Exemplary embodiments provide for a cost savings over the traditional WOZ system and data collection method. Exemplary embodiments may be packaged as a reusable asset, which can be easily applied to future natural language call routing system deployments. Exemplary embodiments may be used as an initial model to build a proof of concept when resources are limited. The initial topic classification model may be used to provide initial tagging for the text data. Instead of using a tagging guide to tag the text data, the initial topic classification model may provide initial tagging, either the best or the n-best results, and provide feedback. A tagging guide is a guide that tells people how to assign a topic to each sentence based on the sentence's semantic meaning. The feedback provided and initial tagging results can greatly relieve the efforts of the labeler and provide better tagging quality. A labeler is a person who tags the training sentence.

There are two fundamental information sources for building a natural language call routing application according to exemplary embodiments. The first information source is the topic description, typically one sentence per topic, which briefly describes the meaning of each topic in the call routing application. The second information source is a set of common words, called filler words, which are words that are not specifically related to the specific application. Filler words are common words that are not specifically related to the application and do not provide information specific to the topic, such as, for example, a, an, the, and so forth. The contributions of filler words need to be diluted or removed to avoid any biased results. A filler word set is continuously updated and enriched for better performance. Filler word sets are managed as an asset. When a filler word set is robust enough to build a new natural language call routing application, the application developer only needs to provide the topic description of the specific natural language call routing application deployment.

Exemplary embodiments use these two information sources to train the initial topic classification model, using as little as one sentence per topic to train the initial topic classification model. In order to train the initial topic classification model, topic descriptions are obtained. The topic descriptions may be extracted by parsing the call flow documents. A call flow describes how a call from a user is handled. Special characters are removed. Special characters are typically punctuation marks, such as a comma, or period, and so forth. The special characters are part of the topic description but the special characters do not provide helpful semantic information toward topic classification. Optionally, synonyms are provided for the removed special characters from the topic description. Filler words are removed from topic description to generate a compact version of the topic description. Filler words are provided from the filler word list. Removing filler words extracts salient information from the topic description. The initial topic classification model is trained. This process of building the initial topic classification model is superior to a keyword spotting approach, such as the "grep" approach. Grep is Linux™/Unix™ command that is used to find specific sub-strings within a string. Keywords are those words that are specifically related to the topic. The refining of the initial topic classification model captures some "hidden" structure information embedded in the topic description, which leads to better performance for multiple keywords in the input query. For example the phrase "reset my e-mail account password" is different than the phrase "report any problems with my e-mail account" in the sense that the semantic meaning of the two phrases is different. However, these two phrases look similar from a syntactic point of view, as they both contain the key phrase "e-mail account."

In an exemplary embodiment, the initial topic classification model may be used for data collection. Various implementations of exemplary embodiments provide for developing an Internet based or voice based, such as a telephone based, data collection system. The feedback provided by the initial topic classification model is used to help users enter data. The feedback may be in terms of the single best or the n-best results. The existing data is filtered based upon a classification determined by the initial topic classification model. The data may come from web based input, previous text data, or language model training data. Meaningful data from the classification results is extracted and added to the training data set as new training sentences. The initial topic classification model is applied to a WOZ system and provides initial tagging results to the agent to reduce human efforts and errors.

Exemplary embodiments use the filler data to develop the statistical natural language model. The newly collected data is tagged using the initial topic classification model, and the tagged data is reviewed. The initial topic classification model is retrained using the tagged data.

Figure 4:
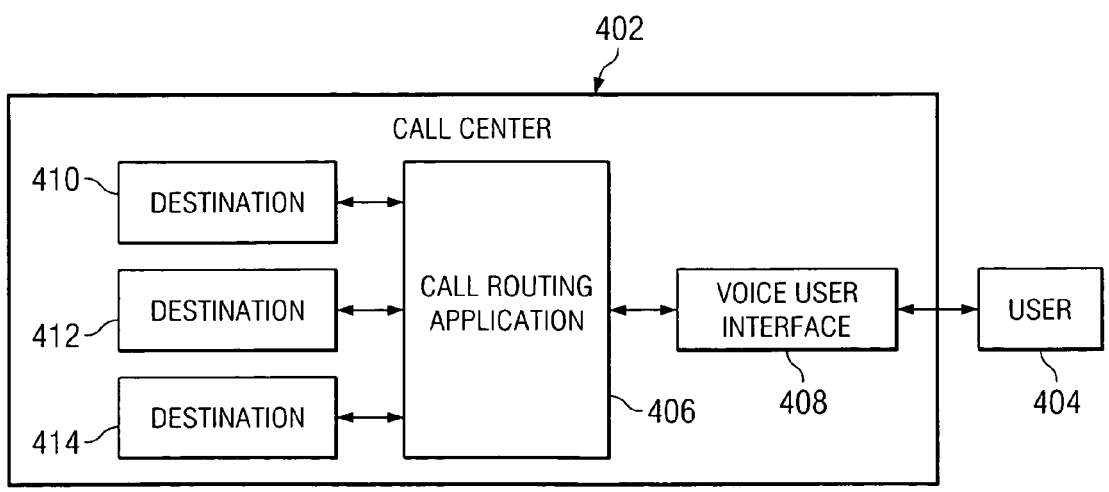
FIG. 4 is a block diagram depicting a system for building data used by the understanding model of a natural language call routing application in accordance with an exemplary embodiment.

FIG. 4 is a block diagram depicting a system for building data used by the understanding model of a natural language call routing application in accordance with an exemplary embodiment. User 404 calls in to call center 402. User 404 connects to call center 402 through voice user interface 408, which allows user 404 to interact with call routing application 406. Call routing application 406 is comprised of a statistical natural language understanding model generated through the use of exemplary embodiments. Call routing application 406 directs the call from user 404 to the proper call destination, such as destination 410, 412, and 414.

Figure 5:
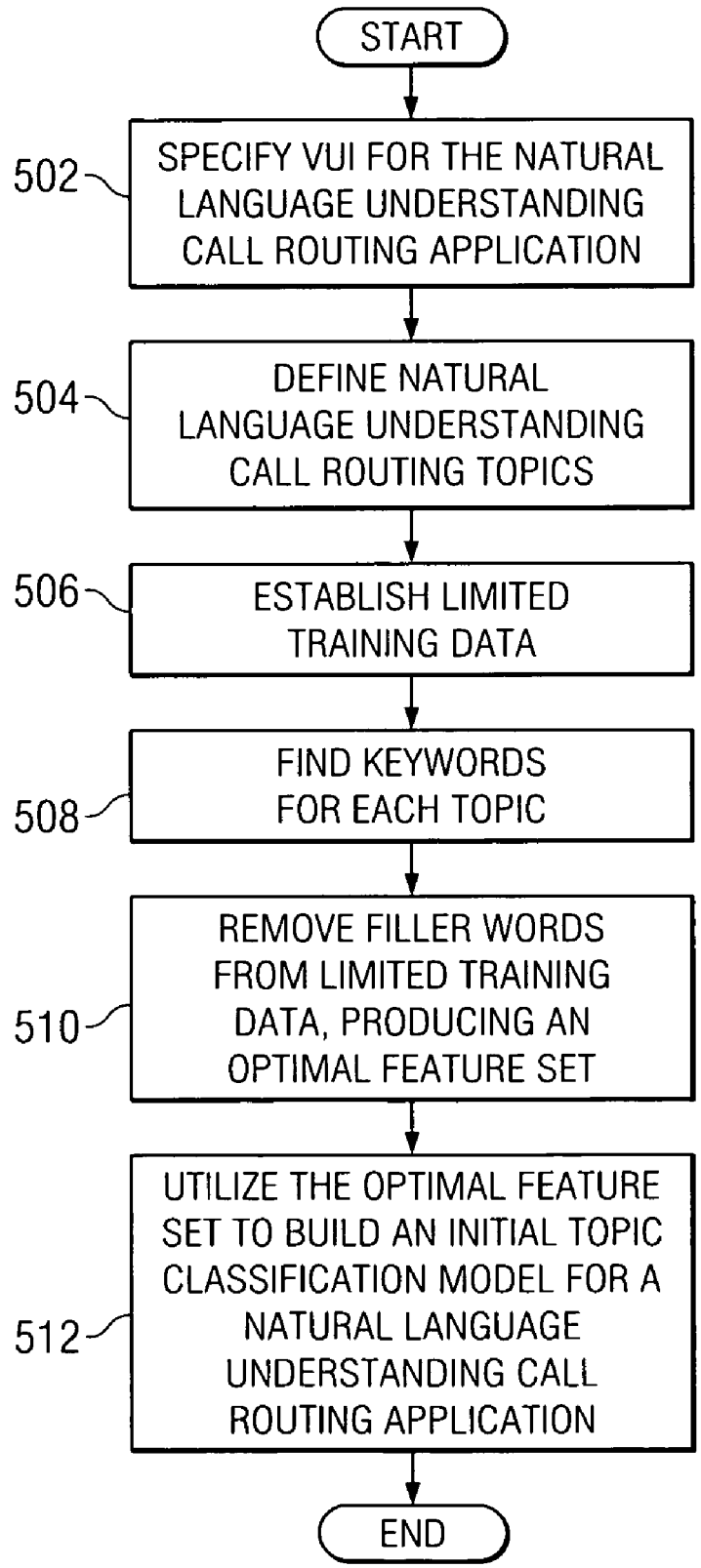
FIG. 5 is flowchart illustrating the operation of building data used by the understanding model of a natural language call routing application in accordance with an exemplary embodiment.

FIG. 5 is flowchart illustrating the operation of building data used by the understanding model of a natural language call routing application in accordance with an exemplary embodiment. The operation may be implemented in a data processing system, such as data processing system 200 in FIG. 2. The operation begins with a call flow that specifies the Voice User Interface (VUI) for the natural language understanding call routing application (step 502). In essence, the VUI provides a definition of the boundaries of user interaction in terms of what is the possible intention of the user and the response or action, for example, a prompt, of the system to those possible intentions. The VUI specification is used to define natural language understanding call routing topics (step 504). Each topic corresponds to a unit of action. A unit of action defines what specific intent a user may have and the response of the system to the specific intent of the user. Based on the topics defined in step 504, limited training data is established (step 506). The training data comprises examples of utterances. For example, the utterances can be as few as one or two sentences for each topic. The total sentences created will serve as training data for the statistical natural language understanding model being developed. Next, keywords are determined for the example sentences specified in step 506 (step 508). In an alternate embodiment, filler words may also be determined for the example sentences specified in step 506. Filler words are removed from the training data leaving only the keywords, and an optimal feature set for building the statistical natural language understanding model is produced (step 510). An optimal feature set is comprised of the words that provide the best information in defining the topic descriptions. An optimal feature set contains not only the individual keywords, but also combinations of the keywords that help to define the topic description. The optimal feature set produced in step 510 is utilized to build an initial topic classification model for a natural language call routing application for call routing (step 512). The optimal feature set may be fed into a natural language understanding engine, which would produce an initial topic classification model for a natural language call routing application. Also, the initial topic classification model can be used to extract relevant data from existing non-related data for adaptation and development of a natural language call routing application.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for providing a statistical initial topic classification model for use in a natural language call routing application to map a natural language user statement to at least one of a plurality of topics in the natural language call routing application, the computer-implemented method comprising acts of:

accessing a voice user interface (VUI) specification that specifies a VUI for allowing users to interact with the natural language call routing application, the VUI specification comprising a plurality of expressions of possible user intentions composed by at least one VUI designer, the VUI specification further comprising, for each one of the plurality of expressions of possible user intentions, at least one system response or action defined by the at least one VUI designer as corresponding to the one of the plurality of expressions of possible user intentions;

analyzing the VUI specification to determine a plurality of topic descriptions, each one of the plurality of topic descriptions describing a meaning of a corresponding one of the plurality of topics; and using, as training data, the plurality of topic descriptions determined by analyzing the VUI specification to build the statistical initial topic classification model, comprising:

identifying keywords in the plurality of topic descriptions used as training data to build the statistical initial topic classification model;

providing an optimal feature set comprising at least one combination of at least some of the keywords; and using at least one computer to build the statistical initial topic classification model based at least partially on the optimal feature set.

2. The method of claim 1, wherein the act of identifying keywords in the training data comprises removing filler words from the training data, the filler words being provided in a filler word set.

3. The method of claim 2, further comprising an act of continuously updating the filler word set.

4. The method of claim 1, wherein, for at least one topic in the plurality of topics, a corresponding topic description comprises no more than two natural language sentences describing the at least one topic.

5. The method of claim 1, wherein accessing the VUI specification comprises accessing at least one call flow document defining how a call from a user is to be handled, and wherein analyzing the VUI specification comprises parsing the call flow document to extract the plurality of topic descriptions.

6. The method of claim 1, wherein each topic description describes a relationship between an intent of a user and a corresponding system response.

7. The method of claim 1, further comprising:

filtering text data using the statistical initial topic classification model to produce filter output, the text data from a source other than the natural language call routing application;

providing additional training data based at least in part on the filter output; and refining the statistical initial topic classification model using the additional training data.

8. At least one tangible non-transitory computer-readable storage medium having encoded thereon computer instructions that, when executed, perform a method for providing a statistical initial topic classification model for use in a natural language call routing application to map a natural language user statement to at least one of a plurality of topics in the natural language call routing application, the method comprising acts of:

accessing a voice user interface (VUI) specification that specifies a VUI for allowing users to interact with the natural language call routing application, the VUI specification comprising a plurality of expressions of possible user intentions composed by at least one VUI designer, the VUI specification further comprising, for each one of the plurality of expressions of possible user intentions, at least one system response or action defined by the at least one VUI designer as corresponding to the one of the plurality of expressions of possible user intentions;

analyzing the VUI specification to determine a plurality of topic descriptions, each one of the plurality of topic descriptions describing a meaning of a corresponding one of the plurality of topics; and using, as training data, the plurality of topic descriptions determined by analyzing the VUI specification to build the statistical initial topic classification model, comprising:

identifying keywords in the plurality of topic descriptions used as training data to build the statistical initial topic classification model;

providing an optimal feature set comprising at least one combination of at least some of the keywords; and using at least one computer to build the statistical initial topic classification model based at least partially on the optimal feature set.

9. The at least one tangible non-transitory computer-readable storage medium of claim 8, wherein the act of identifying keywords in the training data comprises removing filler words from the training data, the filler words being provided in a filler word set.

10. The at least one tangible non-transitory computer-readable storage medium of claim 9, wherein the method further comprises an act of continuously updating the filler word set.

11. The at least one tangible non-transitory computer-readable storage medium of claim 8, wherein, for at least one topic in the plurality of topics, a corresponding topic description comprises no more than two natural language sentences describing the at least one topic.

12. The at least one tangible non-transitory computer-readable storage medium of claim 8, wherein accessing the VUI specification comprises accessing at least one call flow document defining how a call from a user is to be handled, and wherein analyzing the VUI specification comprises parsing the at least one call flow document to extract the plurality of topic descriptions.

13. The at least one tangible non-transitory computer-readable storage medium of claim 8, wherein each topic description describes a relationship between an intent of a user and a corresponding system response.

14. The at least one tangible non-transitory computer-readable storage medium of claim 8, further comprising:

filtering text data using the statistical initial topic classification model to produce filter output, the text data from a source other than the natural language call routing application;

providing additional training data based at least in part on the filter output; and refining the statistical initial topic classification model using the additional training data.

15. A system for providing a statistical initial topic classification model for use in a natural language call routing application to map a natural language user statement to at least one of a plurality of topics in the natural language call routing application, comprising:

at least one processor programmed to;

access a voice user interface (VUI) specification that specifies a VUI for allowing users to interact with the natural language call routing application, the VUI specification comprising a plurality of expressions of possible user intentions composed by at least one VUI designer, the VUI specification further comprising, for each one of the plurality of expressions of possible user intentions, at least one system response or action defined by the at least one VUI designer as corresponding to the one of the plurality of expressions of possible user intentions;

analyze the VUI specification to determine a plurality of topic descriptions, each one of the plurality of topic descriptions describing a meaning of a corresponding one of the plurality of topics; and use, as training data, the plurality of topic descriptions determined by analyzing the VUI specification to build the statistical initial topic classification model, comprising;

identifying keywords in the plurality of topic descriptions used as training data to build the statistical initial topic classification model;

providing an optimal feature set comprising at least one combination of at least some of the keywords; and building the statistical initial topic classification model based at least partially on the optimal feature set.

16. The system of claim 15, wherein the at least one processor is further programmed to:

identify keywords in the training data by removing filler words from the training data, the filler words being provided in a filler word set; and continuously update the filler word set.

17. The system of claim 15, wherein, for at least one topic in the plurality of topics, a corresponding topic description comprises no more than two natural language sentences describing the at least one topic.

18. The system of claim 15, wherein accessing the VUI specification comprises accessing at least one call flow document defining how a call from a user is to be handled, and wherein analyzing the VUI specification comprises parsing the call flow document to extract the plurality of topic descriptions.

19. The system of claim 15, wherein each topic description describes a relationship between an intent of a user and a corresponding system response.

20. The system of claim 15, wherein the at least one processor is further programmed to:

filter text data using the statistical initial topic classification model to produce filter output, the text data from a source other than the natural language call routing application;

provide additional training data based at least in part on the filter output; and refine the statistical initial topic classification model using the additional training data.

21. The method of claim 1, wherein accessing the VUI specification comprises obtaining the VUI specification from the at least one VUI designer.

22. The at least one tangible non-transitory computer-readable storage medium of claim 8, wherein accessing the VUI specification comprises obtaining the VUI specification from the at least one VUI designer.

23. The system of claim 15, wherein accessing the VUI specification comprises obtaining the VUI specification from the at least one VUI designer.

* * * * *